Nov. 30, 1965 N. E. HAGER, JR 3,221,145

LAMINATED HEATING SHEET

Filed Sept. 6, 1963

*INVENTOR.*
NATHANIEL E. HAGER, JR.
*BY*
Theodore L. Thomas

United States Patent Office 3,221,145

Patented Nov. 30, 1965

3,221,145
LAMINATED HEATING SHEET

Nathaniel E. Hager, Jr., Manheim Township, Lancaster County, Pa., assignor to Armstrong Cork Company, Lancaster, Pa., a corporation of Pennsylvania Filed Sept. 6, 1963, Ser. No. 307,038
3 Claims. (Cl. 219—549)

This invention relates generally to a method of making large-area electric heaters and heating sheets adapted for a variety of heating purposes, and more particularly to a laminated unitary structure in sheet form capable of supplying heat over a large surface area. Still more particularly, this invention relates to heating sheets in the form of electric heaters which can be made in extraordinarily large sizes of 100 feet in length or more, and which can perform according to predetermined heating characteristics. This application is a continuation-in-part of application Serial No. 132,496, filed August 18, 1961, now abandoned.

Most electric heaters in the past have been fabricated of resistant wires or resistant elements which are metallic in nature. Some work has been done and some heaters have been described which use resistance elements other than metals as a means for generating heat in electrical heaters. The heater of the present invention is of the type which utilizes at least one metallic foil, and preferably two or three metallic foils bonded together with a uniform layer of semi-insulating material such as a carbon-loaded adhesive. The electric foils serve as electrodes and each foil is connected to a power source in order that electric current may flow through the semi-insulating layer in a direction perpendicular to the foils. In the past, such heaters have been presented as if the electrodes were ideal equipotential surfaces and as if the needed thickness and conducting properties of the semi-insulating layer could readily be calculated in accordance with the laws of Joule and Ohm to obtain a desired heating rate with an available supply voltage. However, in large-area heating sheets, the electrodes are not ideal equipotential surfaces when power is introduced within a restricted portion of the total area of the large electrode heater. The electrodes actually serve to transmit electric power down the length of the large heater. A heating effect and a voltage drop takes place in the electrodes themselves due to the passage of current along the electrodes from the source region to the remote region. In all the prior electrodes, this effect leads to surplus heating near the source region, and reduced heating in the remote regions. To minimize such an effect, prior heaters have generally utilized power connections at opposite extremes of the length of the heater. Even so, reduced heating has taken place in the center regions of the heater and increased heating has taken place in the vicinity of the power connections. It is the primary advantage of the present invention that the heaters may be defined in such manner that the problem of the actual, nonequipotential electrodes is taken into account in fabricating a specific, defined heater. A description of the manner in which power is applied to the heater is an essential feature of the heater system if the heater is to be capable of heating substantially uniformly over its entire area with a minimum of extra heating near the source region and a minimum of diminished heating at the remote regions. Using the method of the present invention, a heater can be made hundreds of feet long which will nevertheless heat with reasonable uniformity even though all power is fed to one end of the heater. An outstanding advantage of such a heater is that a large flexible roll of the heater may be made, and pieces may be taken from the roll which will produce the same heating rate at a given voltage.

The advantage of very thin electrode foils to serve as the electrodes are that the electrodes and the resulting heater are light in weight, possess a high flexibility and low thermal inertia, and are inexpensive. However, even the best conducting metals resist current flow to some extent, and this is especially true when a large current must traverse large distances through a thin foil. Therefore, in order to get current to flow along the thin foil electrodes from the source region of the heater to the most remote region, there must be some voltage difference between the two regions as measured along the electrode. It is one of the advantages of the present invention that there is described the method of determining how thick the electrodes must be in view of the voltage and watt-density requirements in order to limit the extent to which the heater runs cooler in the remote regions than in the source region where the power is applied. A practical uniform heater cannot be defined without specifying the thickness and electrical conductivity of the electrodes, their relationship with the method of connecting power leads, and the electrical properties of the semi-insulating layer.

It is a primary object of the present invention to present such a heater and the method of making it. It is another object of the present invention to present a large-area heater, preferably of at least 16 square feet in area, in which holes, constrictions, or cut-out areas will not vary the heating uniformity of the heater. It is still another object of the present invention to supply a large-area heater in which power may be supplied in any convenient locations on the heater to produce uniform heating at a predetermined rate.

These objects are accomplished in an unusually effective manner. The invention contemplates the method of making large-area electric heaters in which the power per unit area P, watts per square inch, does not vary more than 20% over the entire area. The maximum variability of 20% may be reduced if desired. The heater has a plurality of opposing electrodes of length L inches separted by a semi-insulating layer having a uniform thickness $d$ inches and an electrical volume resistivity $R_a$ ohm-inches in the range $4\times10^3$ to $4\times10^7$ ohm-inches. The power per unit area P and the voltage V volts, which are normally pre-imposed by the heater requirements, have the relationship $$P=\frac{V^2}{R_a d}$$

An electrically conducting bond is formed between the semi-insulating layer and a metallic foil first electrode, the first electrode having a resistivity $R_s$ ohm-inches and a thickness $t$ in the range 0.0001–0.01 inch. At least one other electrically conductive bond is formed between the semi-insulating layer and at least one other metallic electrode, preferably another metallic foil, which lies parallel to the first electrode in order to establish a flow of electrical current from one electrode to another in a direction perpendicular to the planes of the electrodes when a suitable voltage V is impressed across the electrodes. A power connection is formed on each electrode adapted to connect each electrode to a source of electrical power, including, possibly, a ground. The optimum thickness $t$ of the first electrode is selected according to the location of the power connections and according to the relationship of the thickness $t$ with other heater parameters. The thickness $t$ will be a maximum of 2,000K times the quantity $R_sL^2/R_ad$. When the power connections on each electrode are established along a strip the full width of each elecrtode at opposing ends thereof, K will have a minimum of 4. When the power connections on each electrode are established in any other configuration, K will have a minimum of 10. The thickness of the remaining electrodes in the heater will be at least that of the range defined for the first electrode.

The flexible sheet electrodes of the present invention may be made of any suitable connecting metal foil having a thickness in the stated range. This thickness is necessary in order that the most significant embodiment of the present invention possesses the requisite flexibility for storage and shipment in roll form if desired. Additionally, very thin electrodes are desirable in order that the heat capacity of the heater may be maintained at an extremely low level to permit maximum heating rates. Metal foils of aluminum, copper, stainless steel, and the like, may be used. Copper foil having a thickness in the range 0.0005–0.002 inch is preferred in view of its attractive cost, low heat capacity per unit area, excellent electrical properties, and easy workability. Heating sheets of the present invention will normally not be less than one foot in width, and will generally be four feet in width, or wider. The length may be any length selected for the particular purpose so long as the length in relation to the width does not produce an area so great that power requirements per square foot become unreasonable in view of available power input to the heater, and in view of the stated problem about uniformity of heating. A preferred embodiment of the present invention is a 4′ x 8′ panel to supply radiant heat in building construction in conjunction with the normal 4′ x 8′ flooring, siding, and ceiling panels. This size may also be convenient for melting of snow and ice on roads, driveways, and parking lots, although much larger sizes may be preferred. Such panels operated at lower temperatures in the range of 80°–140° F. may be used in large, open, normally cold areas to supply warmth to personnel engaged in some sedentary activty such as the operation of a unit of manufacturing machinery or the like.

The two or more sheet electrodes are separated by a flexible, adhesive, semi-insulating layer (a better term than semi-conducting layer, although it means exactly the same thing) bonded or fused to give good electrical contact with each of the sheet electrodes and positioned between the electrodes in such manner as to coat and cover substantially the entire opposing faces of the sheets electrodes. To maintain flexibility and low heat capacity where needed in the product, the semi-insulating layer should have a thickness in the range 0.2–0.001 inch. To obtain gentle heating with the normal 120 volts, the resistivity of this semi-insulating layer must be in the range of $4\times10^3$ to $4\times10^7$ ohm-inches ($10^4$–$10^8$ ohm-centimeters); it is not at all a good electrical conductor. The electrical volume resistivity, called simply "resistivity" throughout, is measured by the resistance of a body of unit cross-section and of unit length. The resistivities are those measured under the same conditions prevailing when the heater is in use. The resistivity of the semi-insulating layer of film, and its thickness, control the heat output of a unit area of the heater of the present invention at a given potential difference V across the film from electrode to opposing electrode. The resistivity of electrical insulators is in the range of $10^{10}$–$10^{15}$ ohm-centimeters, while that of conductors is of the order of $10^{-6}$ ohm-centimeters.

The semi-insulating layer of film may be fabricated of any material giving the requisite resistivity within the stated thickness while maintaining a good bond and electrical contact with the opposing sheet electrodes. One suitable material is an epoxy resin which is the reaction product of epichlorohydrin and a bis-phenol. The resin may be in the solid state in which case the resin should preferably be melted before application to the sheet electodes. Where the condensation between the bisphenol and epichlorohydrin is not carried as far, the epoxy resin will be a liquid and may be applied in the form of a film to the sheet electrodes without heat. Any conventional method of applying films, such as reverse roller coating, may be used. A hardening agent or catalyst should be admixed with the epoxy resin before application to the sheet electrodes in order to cause cure or crosslinking of the epoxy resin. These hardening agents are well-known in the art and generally comprise amines or amides, the amines or amides frequently being of relatively long-chain in order to retard the otherwise rapid curing action of the catalyst. Conductive carbon black should be incorporated into the epoxy resin in an amount sufficient to adjust the resistivity of the final film to within the limits stated earlier.

Other suitable materials for forming the semi-insulating layer or film are the latices of thermoplastic materials such as poly(vinyl acetate), vinyl chloride-vinyl acetate copolymers, vinyl acetate-ethyl acrylate copolymers, acrylic ester polymers, and the like. In each case the film must be an adhesive film in order to bond tightly to the sheet electrodes. Suitable amounts of conductive carbon black or graphite may be admixed with such latices, and the resulting mixture doctored, sprayed, rolled, or otherwise suitably applied to one or both opposing surfaces of the sheet electrodes. Conducting ceramic materials, particularly the cermets, may be used to allow use of higher temperatures in the heater. It will be appreciated that the film thickness of the semi-insulating layer should remain substantially constant throughout the entire sheet heater in order to obtain uniform heating. The film containing the requisite amount of conducting material such as carbon black may be applied to one surface of a sheet of metal foil, and dried. The same film may also be applied to the second electrode if desired. The two metal foils are then brought into face-to-face contact with the film or films betwen the two sheet electrodes where a two-electrode sheet is to be made. This may be done on a calender or flat bed press or any suitable rolling or pressing means. Heat will generally be required in order that the film may flow or in order that a curable semi-insulating film be cross-linked or cured. Once the two metal sheets have been laminated by means of the semi-insulating adhesive film of the requisite resistivity, power connections will be made on the sheets. The power connections may be left protruding from the sheet if desired if such are to be used, or one entire edge of the heating sheet may be left uncoated in order that it may serve as an edge power connection.

Not only must the resistivity of the semi-insulating layer be adjusted so that the needed heat generation will occur with a conveniently applied voltage when the layer is used in a practical thickness, but also the resistivity of the layer must be higher than that of the electrode material in order that the voltage drop along the electrode surface will be negligible compared with the voltage drop across the semi-insulating layer. A convenient criterion exists for establishing the permissible minimum resistivity of the semi-insulating layer for a given configuration of electrodes and semi-insulating layer, voltage requirements aside. If the resistivity of the semi-insulating adhesive layer is $R_a$, the resistivity of the sheet electrode is $R_s$, the thickness of the sheet electrode is $t$, the thickness of the semi-insulating layer is $d$, and the distance from the point where the connecting leads are fastened to the most remote part of the heater is L in that instance where the power connections are diametrically opposed at corresponding points on the sheet electrodes, all linear measurements being in the same units, then the criterion for 10% variation from the average value (which is a 20% variation between extremes) can be established in the relationship $$\frac{R_a}{R_s}=\frac{10L^2}{td}$$

It can be seen that the creation of a large-area heating sheet of the present invention is not merely a matter of adjusting the resistivity of the semi-insulating layer so that the desired rate of heating is obtained with the chosen voltage. The resistivity of the semi-insulating layer must be such in relation to the resistivity of the sheet electrodes that the electrodes are reasonably equipotential surfaces when in operation.

In making the acutal electrode to be used for some predetermined aplication, the power per unit area P and the available voltage V volts are usually known. In fact P and V are usually imposed by the heater requirments and source of power. The thickness $d$ of the semi-insulating layer may be chosen for convenience and cost within the limits stated The relationship of all these variables with the resistivity $R_a$ of the semi-insulating layer is expressed by $$P=\frac{V^2}{R_a d}$$

This equation is convenient to use in selecting the predetermined performance of the heater whether it be a short one of a few feet, or a long one of 100 feet or more.

An expresion showing the limiting length $L_{max.}$ of a heater which will maintain a power per unit area P within 20% over its entire area for power connections along corresponding edges of the electrodes is $$L_{max.}=0.25V\sqrt{\frac{t}{R_s P}}$$

A study of the variation of the power per unit area down the length of large-area heaters having power connections in different positions and of different types on the electrodes has shown the relationship of the various heater parameters with the maintenance of the electrodes as reasonably equipotential surfaces. The relationship is expressed by $$t=K\left(\frac{R_s L^2}{R_a d}\right)$$

where the quantities have the designation given earlier, and K is a range of numbers depending on the physical location of the power input to the heater. If the power input to the heater is all along one edge of the heater at corresponding edges or strips of opposing electrodes, then K is in the range 10–2,000. If the power connections are at points at corresponding areas of opposing electrodes or at opposite ends of opposing electrodes, all having a limited region not exceeding 10 square inches of electrode power connection contact area on each electrode, then K is also in the range 10–2,000. If the power connections are made all along one edge of the heater at diametrically opposed ends of the electrodes so that the current may be thought of as flowing in at one electrode at one end and out another electrode at the other end, then K is in the range 4–2,000. It is interesting to note that K is a maximum of 2,000 in all power connection configurations, although use of the maximum or a large K will sometimes produce an electrode thickness larger than it has to be. The minimum K varies with location and type of power connection. For connections in the shape of a long strip, K will preferably be 4 for connection at opposite ends of the opposing electrodes, and preferably 16 at corresponding ends of opposing electrodes. Strip connections at intermediate regions between these two extremes will preferably be between 4 and 16. The K values of 4 and 16 yield heater having the thinnest possible electrodes for a 20% variation in surface temperature. Higher K values yield thicker electrodes, but the variation in heating will be less than 20% and hence improved. For spot connections, higher K values, at least of several hundred, are preferred.

Referring to the preferred embodiment of the 4′ x 8′ foot panels using a 2-electrode sheet, the requisite heat output of the order of 10 watts per square foot for use as a radiant heating panel for space heating is easily achieved on 120 volts with a semi-insulating layer of thickness of 0.01 inch and a resistivity of $5\times10^7$ ohm-centimeters. This heater may be positioned over ceiling or wall panels in order that the particular panel involved be converted into a radiant heating panel. An entire ceiling or wall may thus become a radiant ceiling or wall by using a multiplicity of the sheet heaters of the present invention. Pieces may be cut from the sheet heater of the present invention either from the edges thereof or in the center thereof without affecting the function of the heater. Holes may be punched through where desired. Where the heater is used in residential building, it eliminates the need for a vapor barrier in a panel combination since vapor cannot pass through the layers of metal foil. It is preferred in such construction that the electrode most likely to be touched be grounded to prevent the possibility of shock hazard in the event of nailing into the panel.

The invention will be better understood by reference to the accompanying drawing, in which FIG. 1 shows a simplified isometric view of a two-eletrode heater of the present invention having two openings cut therefrom;

FIG. *5a* shows a simple edge-connected heater having strip connections at corresponding ends;

FIG. *5b* shows a simple edge-connected heater having strip connections at opposite ends, and FIG. *5c* shows a simple spot-connected heater connected at opposite ends thereof.

Figure 1:
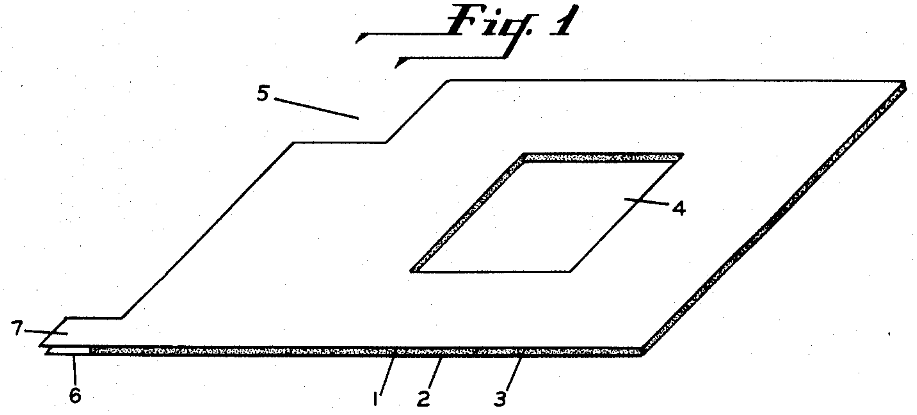

Referring to FIG. 1, the conducting metal foil electrodes 1 and 2 are separated by a semi-insulating layer 3 having the requisite resistivity. An opening 4 has been cut in the sheet heater in order that the sheet heater might be positioned around some obstacle such as a room thermostat or switch box. Additionally, one corner of the sheet heater has been removed at 5.

Figure 2:
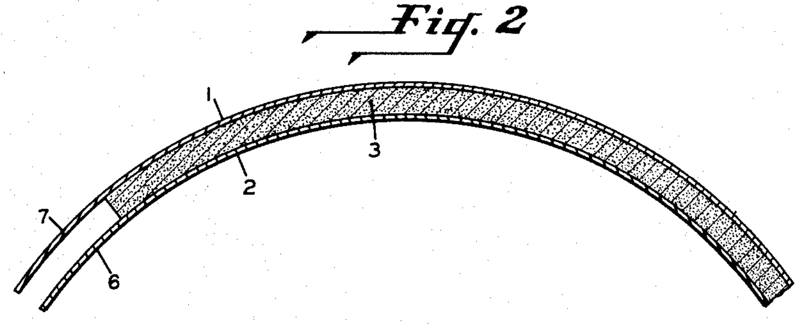
FIG. 2 shows a curved, side view of the sheet heater of the present invention.

Referring to FIG. 2, the flexibility of the electrodes and the semi-insulating layer allows the heater to be readily bent. The semi-insulating layer 3 separates electrodes 1 and 2 as described earlier. Spot power connections 6 and 7 on corresponding portions of opposing electrodes 2 and 1 are used to impress a suitable potential across the electrodes from a suitable power source, not shown.

Figure 3:
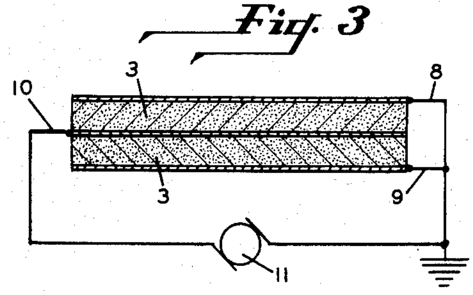
FIG. 3 represents a three-electrode embodiment in section.

In FIG. 3, three electrodes are used. Electrodes 8 and 9 are connected to ground while electrode 10 is the hot electrode spot connected to the hot side of a suitable power source such as the generator 11. The semi-insulating layers 3 have the usual thickness and resistivity. One of the great advantages of a heater such as illustrated in FIG. 3 is that the outer electrodes are grounded thus minimizing shock hazard in applications around the home or in other areas where people might come in contact with the electrodes. The heater may be made even safer in this regard by utilizing the hot electrode 10 in a thinner form than the grounded electrodes 8 and 9. In such instance, any shorts established in the heater will more quickly burn themselves out in the interior of the heater in the vicinity of the thinner electrode 10 than at the exterior of the heater in the vicinity of the ground electrodes 8 and 9. This type of heater is a preferred embodiment of the present invention, and the relationships described earlier herein are all applicable in designing it. In fact, the method of the present invention is especially suitable in keeping the inner foil as thin as possible while maintaining uniform heating. The heater illustrated in FIG. 3 is of sufficient thinness in its entirety that heat generated anywhere within the heater is readily available to an object on each side of the heater. More specifically, an object positioned on the side of the heater near electrode 8 will receive almost as much heat in the regions nearer to electrode 9 as the object does from the regions nearer to electrode 8 in view of the thinness of the entire heater. Current flows in opposite directions in the two halves.

Figure 4:
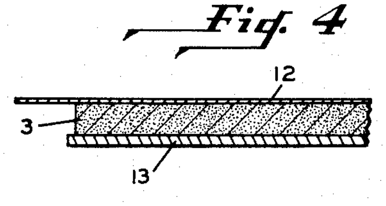
FIG. 4 shows a heater made from foil and a plate.

FIG. 4 illustrates an embodiment wherein the heater is fabricated from a metal foil 12 and stiffer and thicker plate 13. Electrodes 12 and 13 are separated by the usual semi-insulating layer 3. This embodiment of the large-area sheet heater of the present invention may have little or no flexibility, but may be used where heating applications require a more rigid heater such as a warming, heating, or cooking pad adapted for countertop heating of foods and liquids.

Figure 5:
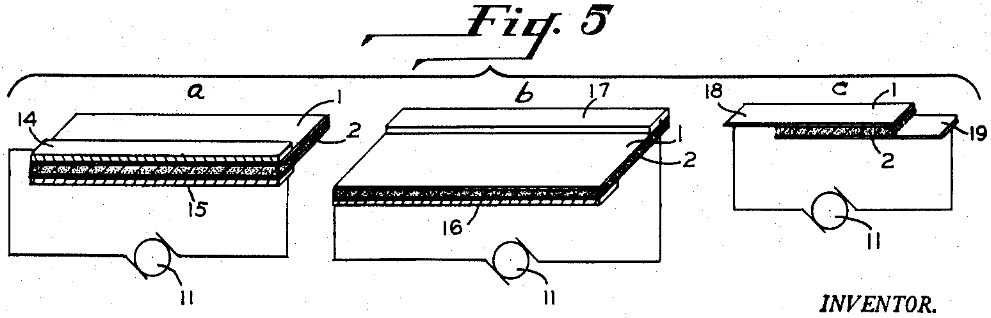

The three parts of FIG. 5 illustrate three other conditions of power connections to the heaters of the present invention. FIG. 5*a* shows edge connections 14 and 15 on corresponding portions of opposing electrodes 1 and 2. FIG. 5*b* shows edge connections 16 and 17 on opposite portions of opposing electrodes 1 and 2. FIG. 5*c* shows spot connections 18 and 19 on opposite portions of opposing electrodes 1 and 2. Power connections at intermediate positions may be made if desired.

The following examples illustrate several embodiments of the invention. All parts are by weight unless otherwise stated.

*Example 1*

A semi-insulating adhesive composition was prepared of the following formulation:

| Ingredients: | Parts |
|---|---|
| 67% ethyl acrylate—33% methyl methacrylate copolymer; 46% solids latex | 400.8 |
| Polyethylene glycol tert. dodecyl thioether | 2.4 |
| Tributyl phosphate | 4.0 |
| Dispersing agent (Tamol 731) | 14.4 |
| Aqueous dispersion of carbon black (Aquablak 15, 30% solids) | 98.3 |
| Calcium carbonate | 700.0 |

The film was coated on copper foil having a thickness of 0.0008 inch, the film measuring 5–6 mils in thickness. After drying, two coated sheets of the copper foil were passed to a calender in which the two coated sheets of copper foil were adhered one to the other by pressing the coated surfaces against each other in the calender at a temperature of 275° F.

The resistivity of the semi-insulating layer between the two sheets of copper foil was in the range $2.49\text{–}3.38 \times 10^7$ ohm-centimeters, which satisfies the requirement for heating uniformity over large surfaces.

The peel strength of the semi-insulating layer on a specimen measuring 2½" x 6" was 6½ lbs.

The opposite sheets of metal foil making up the sheet electrodes were connected across a power source of 120 volts, whereupon the sheet electrode achieved within 60 seconds a temperature elevation of about 7° F. above room temperature, and at equilibrium, a temperature elevation of about 25° F. The temperature effects remained unchanged when a piece was cut from the corner of the electrode.

*Example 2*

The following composition was made:

| Ingredients: | Parts |
|---|---|
| Water | 110.0 |
| Vinyl acetate-long chain acrylate copolymer, 54.5% solids (Gelva emulsion TS–100) | 338.3 |
| Dispersing agent, mixed hydrocarbons, metallic soap, and silicone (Nopco NDW) | 6.8 |
| Polyethylene glycol tert. dodecyl thioether | 2.4 |
| Carbon black dispersion (Aquablak 15) | 112.5 |
| Dispersing agent (Tamol 731) | 14.4 |
| Calcium carbonate | 700.0 |

The above composition was roll-coated onto two sheets of copper foil. The films were dried, and the sheets were laminated as in Example 1 yielding a semi-insulating film between the sheet electrodes measuring 10–12 mils and possessing a resistivity in the range of $2.71\text{–}3.03 \times 10^7$ ohm-centimeters.

The sheet heater achieved an equilibrium temperature of about 25° F. above room temperature when connected across a voltage source of 120 volts.

*Example 3*

Sheet electrode heaters were made in the usual manner when using the following two compositions as a semi-insulating adhesive film between the two metallic foil sheets.

| Ingredients: | Parts |
|---|---|
| Water | 300.0 |
| Polyvinyl acetate (Elvacet 81–900, 55% solids) | 221.6 |
| Dispersing agent (Nopco NDW) | 4.3 |
| Triethylene glycol phthalate | 65.6 |
| Polyethylene glycol tert. dodecyl thioether | 2.4 |
| Dispersing agent (Tamol 731) | 14.4 |
| Carbon black dispersion (Aquablak 15) | 125.0 |
| Calcium carbonate | 700.0 |

Resistivity of the adhesive film was about $10^7$ ohm-centimeters. The following formulation was also made:

| Ingredients: | Parts |
|---|---|
| Resinous reaction product of epichlorohydrin and a bis-phenol (Epon 828) | 100 |
| Methyl ethyl ketone | 30 |
| Denatured alcohol | 24 |
| Carbon black (Sterling-R) | 76 |

The above composition was thoroughly admixed with 6.5 parts triethylene tetramine per 100 parts of the composition before doctoring a 10-mils film on each of two sheets of copper foil. The coated surfaces were pressed against each other and allowed to cure to form the finished sheet heater.

*Example 4*

The following table shows the limiting heater lengths, $L_{max.}$ for three electrode materials when the power is introduced along the width of the heater and the uniformity of heating is maintained within 20%.

| Electrode material | t (in.) | $R_s$ (ohm-in.) | P (watts/ft.$^2$) | $L_{max.}$ (ft.) V=120 volts | $L_{max.}$ (ft.) V=12 volts |
|---|---|---|---|---|---|
| Copper | 0.0008 | $0.67 \times 10^{-6}$ | 1 | 1,020 | 102 |
| | | | 10 | 324 | 32.4 |
| | | | 100 | 102 | 10.2 |
| | | | 1,000 | 32.4 | 3.24 |
| Stainless Steel | 0.0015 | $30 \times 10^{-6}$ | 1 | 198 | 19.8 |
| | | | 10 | 62.5 | 6.25 |
| | | | 100 | 19.8 | 1.98 |
| | | | 1,000 | 6.25 | 0.625 |
| Aluminum | 0.0002 | $1.5 \times 10^{-6}$ | 1 | 242 | 24.2 |
| | | | 10 | 76.5 | 7.65 |
| | | | 100 | 24.2 | 2.42 |
| | | | 1,000 | 7.65 | 0.765 |

I claim:

1. In an electrical heater comprising opposing electrodes separated by a semi-insulating adhesive layer in which the heat output of the heater is generated by the passage of electrical current therethrough, the improved structure comprising (1) a first metal foil sheet electrode having a power connection thereon and having a resistivity $R_s$ ohm-inches, a thickness $t$ in the range 0.0001–0.01 inch, and a length L inches from the power connection to the furthermost end thereof, (2) a second sheet electrode having a power connection thereon and being parallel to said first electrode and at least the same thickness thereof and adapted to establish a flow of electrical current from one electrode to another in a direction perpendicular to the planes of the sheet electrodes when a suitable voltage is established across the electrodes, (3) a semi-insulating adhesive layer of thickness $d$ inch and resistivity $R_a$ ohm-inches in the range $4\times10^3$ to to $4\times10^7$ sandwiched between opposing faces of said first and second sheet electrode and bonded to the opposing faces of said electrodes over substantially the entire area thereof and in electrical contact therewith, and (4) said thickness $t$ inch of said first electrode being established by the relationship $$t=K\left(\frac{R_sL^2}{R_ad}\right)$$

wherein K is (a) a maximum of 2,000, (b) a minimum of 4 when said power connections are established along a strip the full width of each electrode, and (c) a minimum of 10 when said power connections are established in any configuration other than that defined in (b).

2. A heating sheet according to claim 1 wherein said electrodes comprise copper foil.

3. A heating sheet according to claim 1 wherein said semi-insulating layer comprises a cured epoxy resin containing carbon black distributed therethrough.

References Cited by the Examiner

UNITED STATES PATENTS

| | | | |
|---|---|---|---|
| 2,340,097 | 1/1944 | Woodman | 219—529 |
| 2,619,443 | 11/1952 | Robinson | 317—261 X |
| 2,845,519 | 7/1958 | Willat | 219—528 |
| 2,935,711 | 5/1960 | Christensen | 338—18 |
| 2,952,761 | 8/1960 | Smith-Johannsen | 219—544 X |
| 2,971,073 | 2/1961 | Eisler | 219—481 |
| 2,979,773 | 4/1961 | Bolstad | 338—308 X |
| 3,061,501 | 10/1962 | Ditman et al. | 219—543 |

FOREIGN PATENTS

| | | |
|---|---|---|
| 1,230,097 | 3/1960 | France. |

RICHARD M. WOOD, *Primary Examiner.*